P. R. Leatherman,
Cultivator.

No. 108,159. Patented Oct. 11, 1870.

Witnesses:
J. S. Mabee
Alex. F. Roberts

Inventor:
P. R. Leatherman
per Mmm & Co
Attorneys.

United States Patent Office.

PETER R. LEATHERMAN, OF WOODVILLE, MISSISSIPPI.

IMPROVEMENT IN COTTON-CULTIVATORS.

Specification forming part of Letters Patent No. 108,159, dated October 11, 1870.

*To all whom it may concern:*

Be it known that I, PETER R. LEATHERMAN, of Woodville, in the county of Wilkinson and State of Mississippi, have invented a new and Improved Cotton-Cultivator; and I do hereby declare that the following is a full, clear, and exact description thereof, which will enable others skilled in the art to make and use the same, reference being had to the accompanying drawings, forming part of this specification.

This invention relates to improvement in machines for cultivating cotton; and it consists in arranging a pair of scrapers and ordinary plows with a hinged frame, so as to be elevated above the ground.

It consists, also, in the construction of the transporting-wheels with inclined faces; and it consists, finally, in the arrangement of a pair of fenders with reference to the scrapers, as hereinafter set forth.

Figure 1:
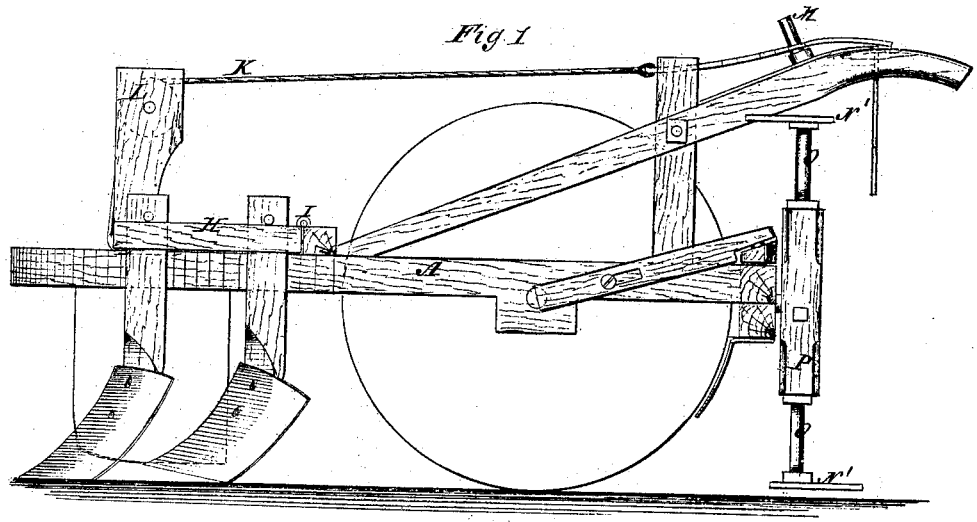
Figure 2:
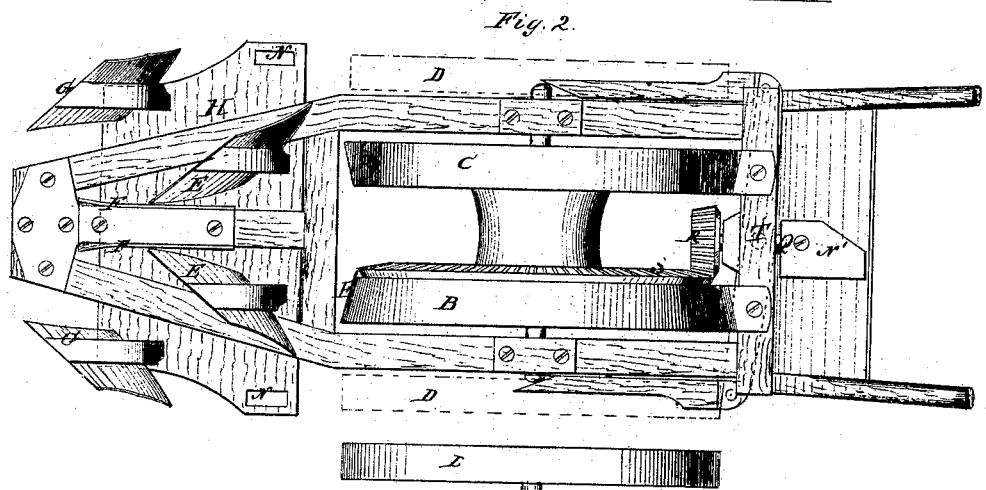

Figure 1 is a side elevation of my improved machine. Fig. 2 is a plan of the bottom of the same when arranged for use as a cotton-scraper. Fig. 3 is a plan of the pair of wheels which I use when employing the machine for cultivating.

Similar letters of reference indicate corresponding parts.

A represents the frame, which is made narrow, with a central space between the side bars, in which space the wheels B C, to be used when the machine is employed for scraping cotton, are placed, as shown in Figs. 1 and 2; but when it is used for cultivating it is mounted on wheels D outside the frame. The faces of the wheels B C are made oblique, as shown at E', for the purpose of running on the smooth inclined paths formed on each side of the row, close up to it, by the scrapers E in scraping the earth from the cotton-plants, the said scraped surfaces affording smooth and even paths, in which the wheels run evenly and smoothly, so as to greatly facilitate guiding, to insure the passing of the fenders F along each side of the row of cotton-plants. The scrapers E and the plows G are suspended from a broad plate, H, or it may be a frame supported on the front part of the main frame and jointed to it at I, so as to be raised up by a rope, K, attached to the front edge, and passed over the pulley L and back to the reach of an attendant, where it is fitted for attachment to a hook or pin, M, for holding the plows up above the ground for turning at the end of the course, or for other purposes. These scrapers or plows are so attached to the plate or frame H by the shanks passing up through mortises N that they may be taken out readily for reversing.

The two front plows G are designed to turn the furrows from the cotton on both sides at the same time.

The scrapers E scrape the earth from close up to the row of plants, and, being inclined upon the bottom on the same angles as the faces of the wheels B C are, form at the same time smooth tracks for them, as above stated.

In using the machine as a cultivator, the scrapers E are detached, and the two front plows are changed from side to side, so as to turn the furrow toward the cotton, and two more plows are applied to the rear outer ends of the frame or plate H, all turning toward the row. The fenders F, which are made of thin sheet metal, and project downward from the frame, to which they are detachably connected on both sides of the row, are designed to be used only when hilling the cotton the first time, to prevent the tender plants from being covered by the earth thrown out by the plows.

The wheels D are substituted for the wheels B C when used as a cultivator.

N represent rotary hoes or choppers, mounted on shanks O, screwing in and out of arms P, mounted on a spindle, Q, having a bevel-wheel, R, gearing with a large wheel, S, on one of the wheels B or C. These choppers are caused, by the rotation, to cut across the rows at intervals for thinning out the cotton, and they are adjusted to vary the depth of cutting by screwing in or out of the arm P. The spindle Q is mounted on a bar, T, capable of moving forward or back for shifting the pinion R into or out of gear with the wheel S, so that the choppers may be prevented from running when turning around at the end of the field.

Having thus described my invention, I claim as new and desire to secure by Letters Patent—

1. The scrapers E E and plows G G, arranged in connection with the hinged plate H, so as to be raised above the surface of the ground by means of the cord K, as shown and described.

2. The wheels B C, with inclined faces, arranged to run in the paths formed by the scrapers, substantially as specified.

PETER R. LEATHERMAN.

Witnesses:
K. MANDELL,
H. S. VAN EATON.